April 2, 1957      N. GEERTSEN      2,787,240
DETECTOR FOR CEMENTED SIDE SEAM CAN BODIES
Filed March 8, 1955
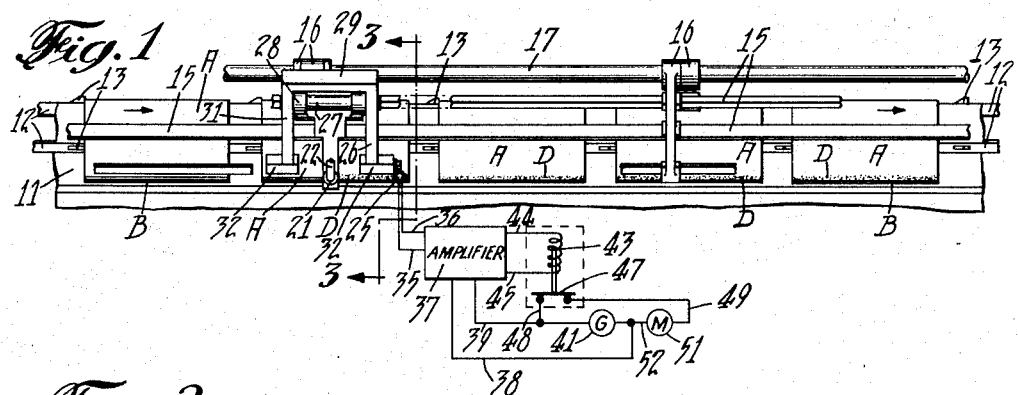
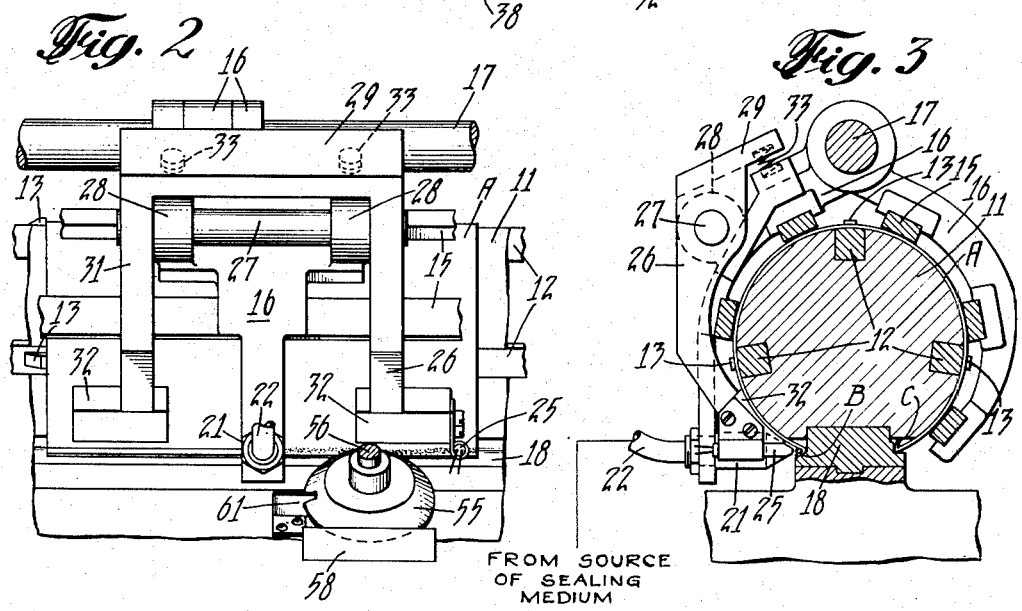
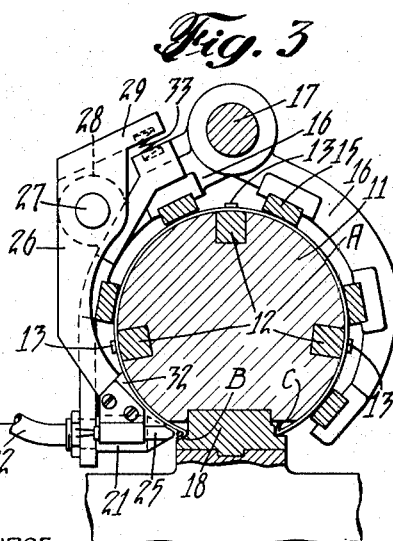
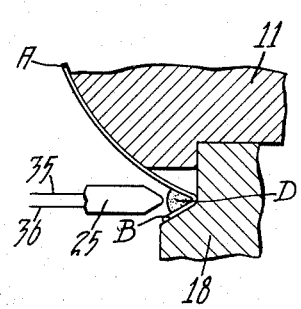
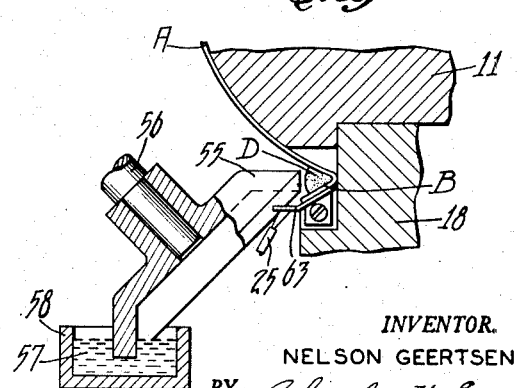
INVENTOR.
NELSON GEERTSEN
BY *Charles H. Erne*
*Leland R. McCann*
*George W. Reiber*
ATTORNEYS

United States Patent Office 2,787,240
Patented Apr. 2, 1957

2,787,240
DETECTOR FOR CEMENTED SIDE SEAM CAN BODIES

Nelson Geertsen, Oak Park, Ill., assignor to American Can Company, New York, N. Y., a corporation of New Jersey Application March 8, 1955, Serial No. 492,970

10 Claims. (Cl. 118—6)

The present invention relates to machines for making can bodies having cemented side seams and has particular reference to devices for detecting bodies which lack an adequate amount of cement on their seams.

In the manufacture of cans for certain products such as oil, detergents, etc. the side seams of the can bodies are sometimes sealed with an adhesive, cement or other suitable nonmetallic compound sealing medium to render the seams hermetic. The sealing medium preferably is applied hot and deposited in one or both side seam edges or side seam hooks of the bodies so that it will be incorporated in the seam when the edges are brought together or the hooks are interfolded and pressed or bumped together in the conventional manner.

When for any reason an insufficient amount of cement is applied to the seam edges or hooks or when the cement is entirely lacking, the deficiency is usually not discovered until the complete can bodies are tested. This testing usually is effected by a testing machine included in the conventional can manufacturing line but before such testing takes place hundreds of cans may be in the line between the point of application of the cement and the tester. Hence by the time the defect is discovered a considerable number of cans may be spoiled by leaky side seams.

It is an object of the instant invention to overcome this difficulty by the provision of devices located adjacent the point of application of the cement for detecting can bodies which lack cement or have an insufficient amount of cement so that the deficiency may be immediately remedied and thus prevent the spoilage or loss of considerable numbers of completed can bodies.

Another object is the provision of such devices which operate to divert such inadequately sealed can bodies from the machine or to effect stoppage of the machine upon detection to prevent further manufacturing operations to be performed upon them until the deficiency is remedied.

Another object is the provision of such devices which free the applied cement of any loose hair-like tentacles caused by a stringy nature of the cement so that the proper detection of the cement may be effected without fouling of the detecting devices.

Numerous other objects and advantages of the invention will be apparent as it is better understood from the following description, which, taken in connection with the accompanying drawings, discloses a preferred embodiment thereof.

Referring to the drawings:

Figure 1 is a fragmentary side elevation of a can body making machine embodying the instant invention, the view also including a wiring diagram of the electrical apparatus used in the invention;

Fig. 2 is an enlarged view of a portion of the machine shown at the left in Fig. 1;

Fig. 3 is an enlarged sectional view as taken substantially along the broken line 3—3 in Fig. 1, with parts broken away;

Fig. 4 is a greatly enlarged sectional view of a portion of the machine shown at the lower left of Fig. 3; and Fig. 5 is a view similar to Fig. 4 and illustrating a modified form of the invention.

As a preferred or exemplary embodiment of the instant invention the drawings illustrate principal parts of a can body making machine of the character disclosed in United States Patent 1,770,041, issued July 8, 1930, to J. F. Peters on Roll Bodymaker. In such a machine flat blanks of tin plate or other sheet metal are wrapped around a stationary horizontally disposed mandrel or horn 11 (Figs. 1, 2 and 3) and advanced in step-by-step fashion through a plurality of working stations disposed along the horn to produce finished can bodies.

Advancement of the partially formed bodies (marked A) along the horn 11 is effected by reciprocating feed bars 12 carrying feed dogs 13. The feed bars 12 are reciprocated in time with the other moving parts of the machine in any suitable manner such as shown in the above-mentioned Peters patent. The partially formed can bodies are held against the horn 11 during their travel therealong by a plurality of guide rails 15 which are disposed adjacent the outer face of the horn and extend longitudinally thereof for nearly its full length. These guide rails 15 preferably are supported in wings 16 which partially surround the horn on both sides thereof as shown in Fig. 3 at spaced intervals along the horn. The wings 16 are hingedly mounted on a hinge bar 17 to provide for swinging the guide rails upwardly out of the way when a jam occurs on the horn.

At one of the working stations in the machine the side seam edges of the partially formed bodies A are bent in reverse directions to form a pair of oppositely disposed, inner and outer seam hooks B, C respectively. After formation, these hooks B, C ride on a track 18 secured to the bottom of the horn 11 to keep the hooks spread apart and in a predetermined relation on the horn.

At a subsequent station a heated fluid sealing medium D (Fig. 4), such as an adhesive, cement or other sealing compound is deposited on one or both of the hooks B, C, preferably on the inner hook B alone as shown in the drawings for incorporation in a side seam produced by interfolding the hooks B, C and pressing or bumping them tightly together in the usual manner to permanently unite the seam edges to produce completed can bodies. The interfolding and bumping operation is performed at a still subsequently located station as disclosed in the above mentioned Peters patent.

Depositing of the heated fluid sealing medium D on the inner hook B preferably is effected by a nozzle 21 which is disposed adjacent the path of travel of the partially formed can bodies A. The nozzle 21 preferably is secured to one of the guide rail support wings 16 for movement out of the way therewith when a jam of bodies occurs on the horn. The inner end of the nozzle is pointed and is located close to the inner hooks B of the passing bodies to direct the fluid sealing medium onto the hook of each passing body in a smooth continuous stream which provides a continuous gasket of uniform thickness on each body. The outer end of the nozzle 21 is connected by a pipe 22 to any suitable supply of the sealing medium under pressure to force the fluid out of the nozzle. The nozzle may be equipped with a shut off valve to cut off the supply of sealing medium after application to each body.

In order to provide for substantially immediate detection of any can bodies which lack or which have an insufficient quantity of sealing medium on their side seam hooks B, due to clogging of the nozzle or other causes, a highly sensitive conventional thermocouple 25 (see also Fig. 4) is disposed adjacent the horn 11 close to the path of travel of the side seam hook B and in spaced longitudinal relation to the nozzle 21. The thermocouple 25 is secured to the lower end of an arm 26 which intermediate its ends is mounted on a pivot pin 27 carried in bearing blocks 28 formed on the adjacent guide rail support wing 16.

The upper end of the arm 26 is connected by a bridge member 29 to a second or auxiliary arm 31 which also is mounted on the pivot pin 27 and which hangs down in substantial parallelism with the arm 26. The lower ends of the arm 26 and the auxiliary arm 31 are provided with shoes 32 which ride against the outer face of the passing can bodies A and thus retain the thermocouple 25 in a predetermined spaced relation to the body hooks B. Compression springs 33 interposed between the bridge member 29 and the adjacent wing 16 yieldably hold the shoes 32 in body contacting relation.

Hence as the partially formed can bodies A with the freshly applied heated fluid sealing medium deposited on their seam hooks B move past the thermocouple 25, the heat from the sealing medium is detected by the thermocouple and is indicated in any suitable manner to show that the sealing medium is being deposited in proper amounts to the bodies for incorporation in the side seams to be subsequently produced. When an insufficient amount of sealing medium is applied to the hooks or when no sealing medium is applied, the lack of heat due to the lack of sealing medium causes a substantially immediate cooling of the thermocouple. This reduction in temperature of the thermocouple causes the latter to indicate such a condition and thereby make known the fact that the body seam hooks B are not properly provided with the sealing medium.

In the instant invention, the thermocouple 25 is utilized to stop the machine and thereby prevent further feeding of can bodies to the nozzle 21 when the thermocouple indicates a lack of heat from the sealing medium. For this purpose the thermocouple 25 is connected by wires 35, 36 (Fig. 1) to a conventional electric current amplifier 37 which is connected by wires 38, 39 to a suitable source of electric current such as a generator 41. The amplifier 37 amplifies the thermoelectromotive force set up through heating of the thermocouple by the sealing medium applied to the can body seam hooks B and this amplified current energizes a solenoid 43 connected to the amplifier by wires 44, 45. The solenoid 43 is part of a relay switch 47 which is maintained normally closed by the heat of the sealing medium acting on the thermocouple. The switch 47 is connected by a wire 48 to the generator wire 39 and by a wire 49 to an electric motor 51 which drives the machine. The motor 51 in turn is connected by a wire 52 to the generator wire 38.

Hence as long as sealing medium D is being applied to the body seam hooks B in proper amounts, the heat of the sealing medium acting through the thermocouple 25 keeps the switch 47 closed and thus causes continued operation of the machine. When the thermocouple 25 indicates a lack of heat which indicates a lack or an insufficient amount of sealing medium on the seam hooks B, the solenoid 43 is deenergized and the switch 47 opens, thus causing the motor 51 and the machine to stop. The thermocouple does not act fast enough to catch the first can body lacking the sealing medium but is sufficiently sensitive to be effected substantially immediately so that even if several bodies pass before the machine stops, the saving in bodies is still considerable. The number of bodies passed depends upon the speed of the machine.

Where the adhesive, cement or other sealing medium is of a stringy nature which leaves hair-like tentacles projecting to foul the thermocouple, a rotating wheel 55 (Figs. 2 and 5) is provided to wipe off or otherwise remove the tentacles before they reach the thermocouple. The wheel 55 may be any form, such as a solid wheel having a continuous outer periphery disposed adjacent the path of travel of the can body seam hooks B or may be in the form of a spider having arms rotated adjacent the travel of the hooks or of any other convenient form. The wheel 55 is located between the nozzle 21 and the thermocouple 25 and is rotated continuously in any suitable manner through a shaft 56 on which the wheel is mounted. The wheel preferably rotates in a bath of oil or other suitable adhesion repellent substance 57 contained in a reservoir 58 to prevent too tenacious adhesion of the tentacles to the wheel. A scraper 61 which rides against the outer periphery of the wheel is provided to scrape the tentacles off the wheel.

In a modified form of the invention as shown in Fig. 5, the thermocouple 25 is connected to a heat transfer plate member 63 which is secured to the body track 18 and on which the body seam hook B rides as the body advances along the horn 11. The heat of the sealing medium D is transferred to this plate 63 to control the operation of the machine as hereinbefore explained in the preferred form.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making can bodies having side seam edges incorporated in a cemented side seam, the combination of means for advancing a partially formed can body along a path of travel, means disposed adjacent said path of travel for applying cement differing in temperature from normal room temperature to one of said body edges, and detector means responsive to the temperature of said cement also disposed adjacent said path of travel beyond said cement applying means for detecting the cement applied to said edge to insure against making can bodies without cement in their side seams.

2. In a machine for making can bodies having side seam edges incorporated in a cemented side seam, the combination of means for advancing a partially formed can body along a path of travel, means disposed adjacent said path of travel for applying cement differing in temperature from normal room temperature to one of said body edges, detector means responsive to the temperature of said cement also disposed adjacent said path of travel beyond said cement applying means for detecting the cement applied to said edge to insure against making can bodies without cement in their side seams, and means responsive to said detector for stopping said machine when body edges lacking cement are detected.

3. A machine of the character defined in claim 1 wherein the cement at the point of application to said side seam edge is in a heated condition and wherein said detector means is a thermocouple responsive to heat in said cement.

4. A machine of the character defined in claim 3 wherein there is provided means responsive to said thermocouple for stopping said machine when body edges lacking cement are detected.

5. A machine of the character defined in claim 3 wherein said thermocouple is disposed adjacent the path of travel of said body edge and in spaced relation to the cement on said edge and wherein there is provided means engageable with said advancing body for maintaining said thermocouple in said spaced relation during the travel of said body past said thermocouple.

6. A machine of the character defined in claim 3 wherein a heat transfer member is disposed adjacent the path of travel of and in engagement with said body edge and wherein said thermocouple is connected to said member.

7. In a machine for making can bodies having reversely bent hooks incorporated in a cemented side seam, the combination of means for advancing a partially formed can body along a path of travel, means disposed adjacent said path of travel for applying heated cement to one of said body hooks, a shoe engageable with the outer surface of said advancing can body, means for yieldably pressing said shoe against said movable body, and heat-sensitive detector means disposed adjacent the path of travel of said body hook in predetermined spaced relation thereto for detecting the cement applied to said hook to insure against making can bodies without cement in their side seams, said detector being movable with said shoe for maintaining said spaced relation during the travel of said body past said detector.

8. In a machine for making can bodies having reversely bent hooks incorporated in a cemented side seam, the combination of means for advancing a partially formed can body along a path of travel, means disposed adjacent said path of travel for applying heated cement to one of said body hooks, heat-sensitive detector means also disposed adjacent said path of travel beyond said cement applying means for detecting the cement applied to said hook to insure against making can bodies without cement in their side seams, and means disposed between said cement applying means and said detector means and located adjacent the path of travel of said body hook for engaging and removing tentacles of cement projecting from said body hook to guard said detector means from said cement tentacles.

9. A machine of the character defined in claim 8 wherein there is provided a rotatable wheel having its periphery disposed adjacent the path of travel of said body hook for removing said cement tentacles, said wheel having a scraper operable thereagainst for cleaning said picked-up tentacles from said wheel.

10. A machine of the character defined in claim 9 having means for applying an adhesion repellent substance to the periphery of said wheel to protect said wheel against the sticking of said tentacles thereto.

References Cited in the file of this patent
UNITED STATES PATENTS 2,626,423    Collins  ---------------- Jan. 27, 1953